(12) United States Patent
Zhang et al.

(10) Patent No.: US 8,821,146 B2
(45) Date of Patent: Sep. 2, 2014

(54) MOLD FOR MANUFACTURING AN I/O PORT OF A COMPUTER FRONT PANEL

(71) Applicants: Xiao-Lin Zhang, Wuhan (CN); Ming-Hui Luo, Wuhan (CN); Hui-Min Zhou, Wuhan (CN)

(72) Inventors: Xiao-Lin Zhang, Wuhan (CN); Ming-Hui Luo, Wuhan (CN); Hui-Min Zhou, Wuhan (CN)

(73) Assignees: Hong Fu Jin Precision Indusrty (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 71 days.

(21) Appl. No.: 13/662,628

(22) Filed: Oct. 29, 2012

(65) Prior Publication Data

US 2013/0259971 A1    Oct. 3, 2013

(30) Foreign Application Priority Data

Apr. 2, 2012    (CN) .......................... 2012 1 0095534

(51) Int. Cl.
*B29C 45/10*    (2006.01)
(52) U.S. Cl.
USPC ........ 425/182; 264/328.7; 425/183; 425/185; 425/588

(58) Field of Classification Search
USPC .......... 425/127, 129.1, 182, 183, 185, 192 R, 425/588; 264/328.7
See application file for complete search history.

(56) References Cited

U.S. PATENT DOCUMENTS

| | | | | |
|---|---|---|---|---|
| 4,202,522 A * | 5/1980 | Hanas et al. | ................... | 425/185 |
| 4,551,084 A * | 11/1985 | Lake | .............................. | 425/185 |
| 5,192,481 A * | 3/1993 | Morita | ........................ | 264/328.7 |
| 5,472,655 A * | 12/1995 | Morita | ........................ | 264/328.7 |
| 6,146,122 A * | 11/2000 | Kato | .......................... | 425/129.1 |
| 6,572,356 B2 * | 6/2003 | Seger | ........................ | 425/192 R |

* cited by examiner

*Primary Examiner* — Tim Heitbrink
(74) *Attorney, Agent, or Firm* — Novak Druce Connolly Bove + Quigg LLP

(57) ABSTRACT

A mold includes a mold core, a first cover, and a second cover. The mold core includes a cavity and a pair of elastic pieces. The pair of elastic pieces is in the cavity and divides the cavity into a first room and a second room. The first cover covers the first room of the cavity. The first cover defines a plurality of first plug holes. A first I/O can be formed in the first room by injecting a first liquid plastic material in the first room via the plurality of first plug holes. The second cover covers the first room and second room of the cavity. The second cover defines a plurality of second plug holes. A second I/O port assembly can be formed by injecting a second liquid plastic material in the first room and the second room via the plurality of second plug holes.

11 Claims, 5 Drawing Sheets

MOLD FOR MANUFACTURING AN I/O PORT OF A COMPUTER FRONT PANEL

BACKGROUND

1. Technical Field

The present disclosure relates to molds, and more particularly to a mold for manufacturing input/output (I/O) ports of a computer front panel.

2. Description of Related Art

In a computer, a front panel is attached on a front side of an enclosure of the computer to cover the front side. For conveniently connecting to peripheral devices, input/output (I/O) ports are formed on the front side. However, for different computers, the I/O ports are different. Therefore, different molds may be needed to manufacture different front panels which have different I/O ports.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
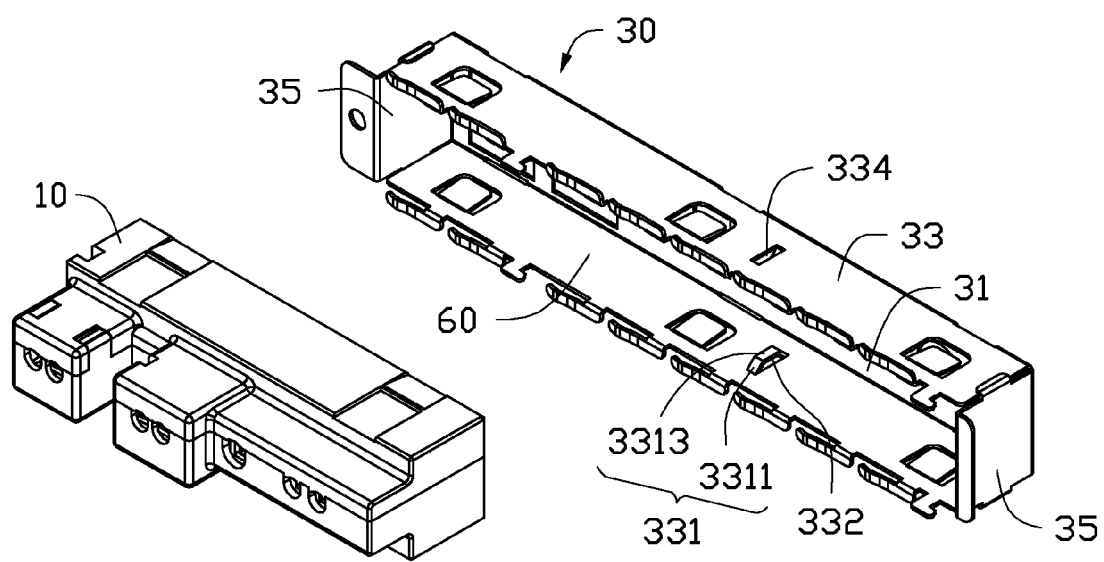
FIG. 1 is an exploded and isometric view of a mold core of a mold and a first I/O port assembly formed by the mold in accordance with an embodiment.

Referring to FIG. 1, a mold for manufacturing input/output (I/O) ports of a computer front panel includes a mold core 30.

The mold core 30 includes a bottom wall 31, a pair of parallel first sidewalls 33, and a pair of parallel second sidewalls 35. The pair of first sidewalls 33 are connected to two opposite edges of the bottom wall 31. The pair of second sidewalls 35 are connected to another two opposite edges of the bottom wall 31. The pair of second sidewalls 35 are perpendicular to the pair of first sidewalls 33. The bottom wall 31, the pair of first sidewalls 33, and the pair of second sidewalls 35 cooperatively define a cavity 60.

Each of the pair of first sidewalls 33 defines a hole 334. An elastic piece 331 is connected to opposite edges of the hole 334. The elastic pieces 331 of the pair of sidewalls 33 extend toward each other. Each of the elastic pieces 331 includes a pair of connection portions 3311 and an abutting portion 3313. Each of the pair of connection portions 3311 are slantingly connected to a corresponding one of the pair of first sidewalls 33. A gap 332 is defined between the abutting portion 3313 and the first sidewall 33. The two elastic pieces 331 of the pair of first sidewalls 33 divides the cavity 60 into a first room 61 and a second room 63.

Figure 2:
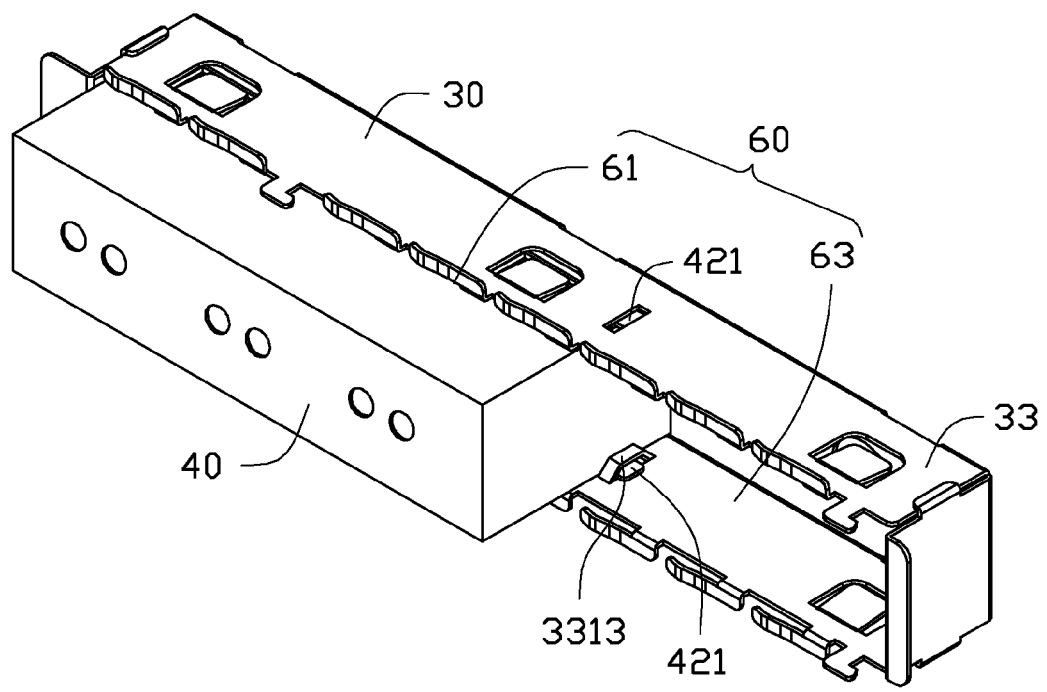
FIG. 2 is an assembled view of the mold core and a first cover of the mold of FIG. 1.
Figure 3:
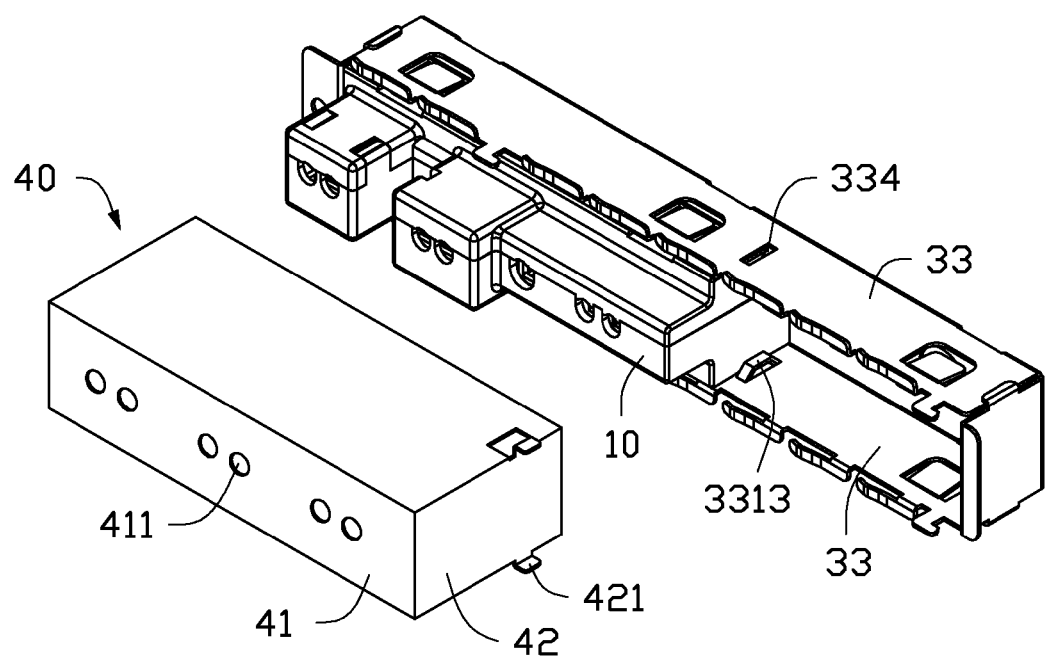
FIG. 3 is an exploded and isometric view the mold core and the first cover of the mold of FIG. 1.

Referring to FIGS. 1 to 3, a first cover 40 is adapted to cover the mold core 30 to form a first I/O port assembly 10 of one front plate. The first cover 40 includes a first cover panel 41 and a first side panel 42. The first side panel 42 is perpendicularly connected to an edge of the first cover panel 41. A length of the first cover 40 is smaller than a length of the mold core 30. The first cover panel 41 defines a plurality of first plug holes 411. The first side panel 42 forms a pair of clasps 421.

To form the first I/O port assembly 10, the first cover panel 41 of the first cover 40 is placed on the cavity 60 of the mold core 30. The clasp 421 of the first cover panel 41 is inserted in the gap 332 and engaged on the elastic piece 331 to mount the first cover 40 on the mold core 30. Liquid plastic material is injected in the first room 61 of the cavity 60 via the first plug holes 411. The liquid plastic material is solidified in the first room 61 to form the first I/O port assembly 10.

Figure 4:
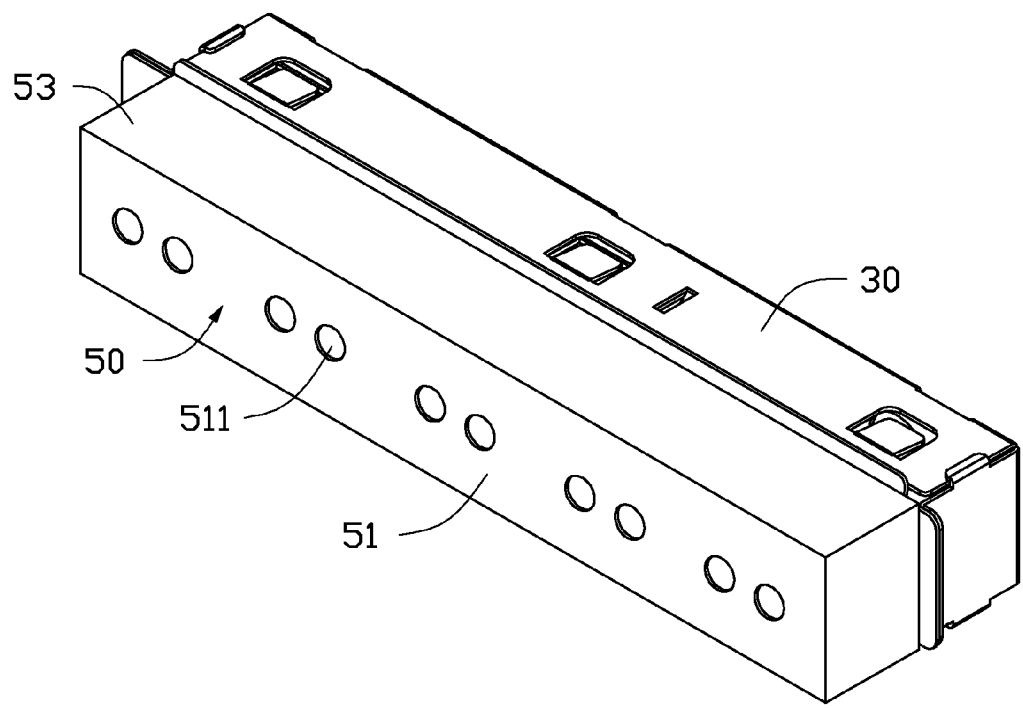
FIG. 4 is an assembled view of the mold core and a second cover of the mold.
Figure 5:
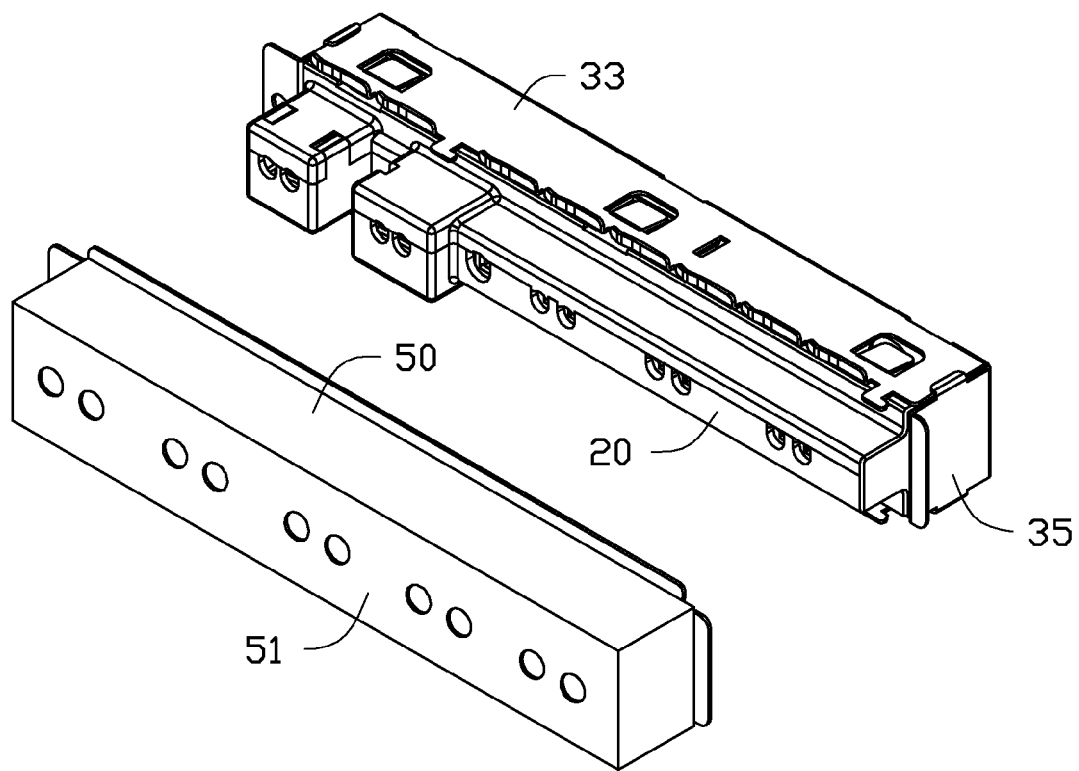
FIG. 5 is an exploded and isometric view the mold core and the second cover of the mold of FIG. 1.

Referring to FIGS. 4 and 5, a second cover 50 is adapted to cover the mold core 30 to form a second I/O port assembly 20 of another front plate. The second cover 50 includes a second cover panel 51 and a pair of second side panels 53 connected to two opposite edges of the second cover panel 51. The second cover panel 51 defines a plurality of second plug holes 511.

To form the second I/O port assembly 20, the second cover panel 51 of the second cover 50 is covered on the cavity 60 of the mold core 30. The pair of second side panels 53 is located between the pair of first sidewalls 33 of the mold core 30. The abutting portions 3313 of the elastic pieces 331 abut the pair of second side panels 53 and are deformed by the pair of second side panels 53. The elastic pieces 331 urge on the pair of second side panels 53 to mount the second cover 50 on the mold core 30. Liquid plastic material is injected in the first room 61 and the second room 63 of the cavity 60 via the second plug holes 511. The liquid plastic material is solidified in the first room 61 and the second room 63 to form the second I/O port assembly 20.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mold, comprising:
   a mold core comprising a cavity and a pair of elastic pieces, the pair of elastic pieces being in the cavity and dividing the cavity into a first room and a second room;
   a first cover configured to cover the first room of the cavity, the first cover defining a plurality of first plug holes, and a first I/O port assembly configured to be formed in the first room by injecting a first liquid plastic material into the first room of the cavity via the plurality of first plug holes; and
   a second cover configured to cover the first room and second room of the cavity, the second cover defining a plurality of second plug holes, and a second I/O port assembly configured to be formed in the cavity by injecting a second liquid plastic material into the first room and the second room via the second plug holes.

2. The mold of claim 1, wherein the mold core comprises a bottom wall, a pair of parallel first sidewalls, and a pair of parallel second sidewalls, and the bottom wall, the pair of first sidewalls, and the pair of second sidewalls cooperatively define the cavity.

3. The mold of claim 2, wherein the pair of elastic pieces are located on the pair of first sidewalls, and the pair of elastic pieces extend toward each other.

4. The mold of claim 3, wherein each of the pair of elastic pieces comprises a pair of connection portions and an abutting portion, each of the pair of connection portions is slantingly connected to each of the pair of first sidewalls, and the abutting portion is connected between the pair of connection portions.

5. The mold of claim 4, wherein a gap is defined between the abutting portion and each of the pair of first sidewalls, the first cover comprises a pair of clasps, and each of the pair of clasps is configured to be inserted in the gap and engaged on each of the pair of elastic pieces to mount the first cover on the mold core.

6. The mold of claim 4, wherein the second cover comprises a pair of second side panels, and the pair of second side panels are located between the pair of first sidewalls, each of the pair of elastic pieces is configured to abut each of the pair of second side panels and to apply force on the pair of second side panels to mount the second cover on the mold core.

7. The mold of claim 6, wherein a second cover panel is connected between the pair of second side panels, and the plurality of second plug holes are defined in the second cover panel.

8. A mold, comprising:
   a mold core comprising a pair of first sidewalls, a cavity defined between the pair of first sidewalls, a pair of elastic pieces formed on the pair of first sidewalls, each of the pair of elastic pieces comprising a pair of connection portions and an abutting portion, each of the pair of connection portions being slantingly connected to each of the pair of first sidewalls, and the abutting portion being connected between the pair of connection portions, and a gap being defined between the abutting portion and each of the pair of first sidewalls;
   a first cover comprising a pair of clasps, and each of the pair of clasps being configured to be inserted in the gap and engaged on each of the pair of elastic pieces to mount the first cover on the mold core; and
   a second cover comprising a pair of second side panels, the pair of second side panels being located between the pair of first sidewalls, each of the pair of elastic pieces being configured to abut each of the pair of second side panels and to apply force on the pair of second side panels to mount the second cover on the mold core.

9. The mold of claim 8, wherein the pair of elastic pieces divide the cavity into a first room and a second room, the first cover is configured to cover the first room of the cavity, and the second cover is configured to cover the first room and the second room of the cavity.

10. The mold of claim 9, wherein the first cover comprises a first cover panel, the first cover panel defines a plurality of first plug holes, and a first I/O port assembly is configured to be formed in the first room by injecting a first liquid plastic material into the first room of the cavity via the plurality of first plug holes.

11. The mold of claim 9, wherein a second cover panel is connected between the pair of second side panels, and a plurality of second plug holes are defined in the second cover panel, and a second I/O port assembly is configured to be formed in the first room and the second room by injecting a second liquid plastic material into the first room and the second room of the cavity via the plurality of second plug holes.

* * * * *